Aug. 9, 1955  W. B. COUGHLIN  2,715,178
TRAIN DESCRIBER SYSTEM
Filed June 16, 1951
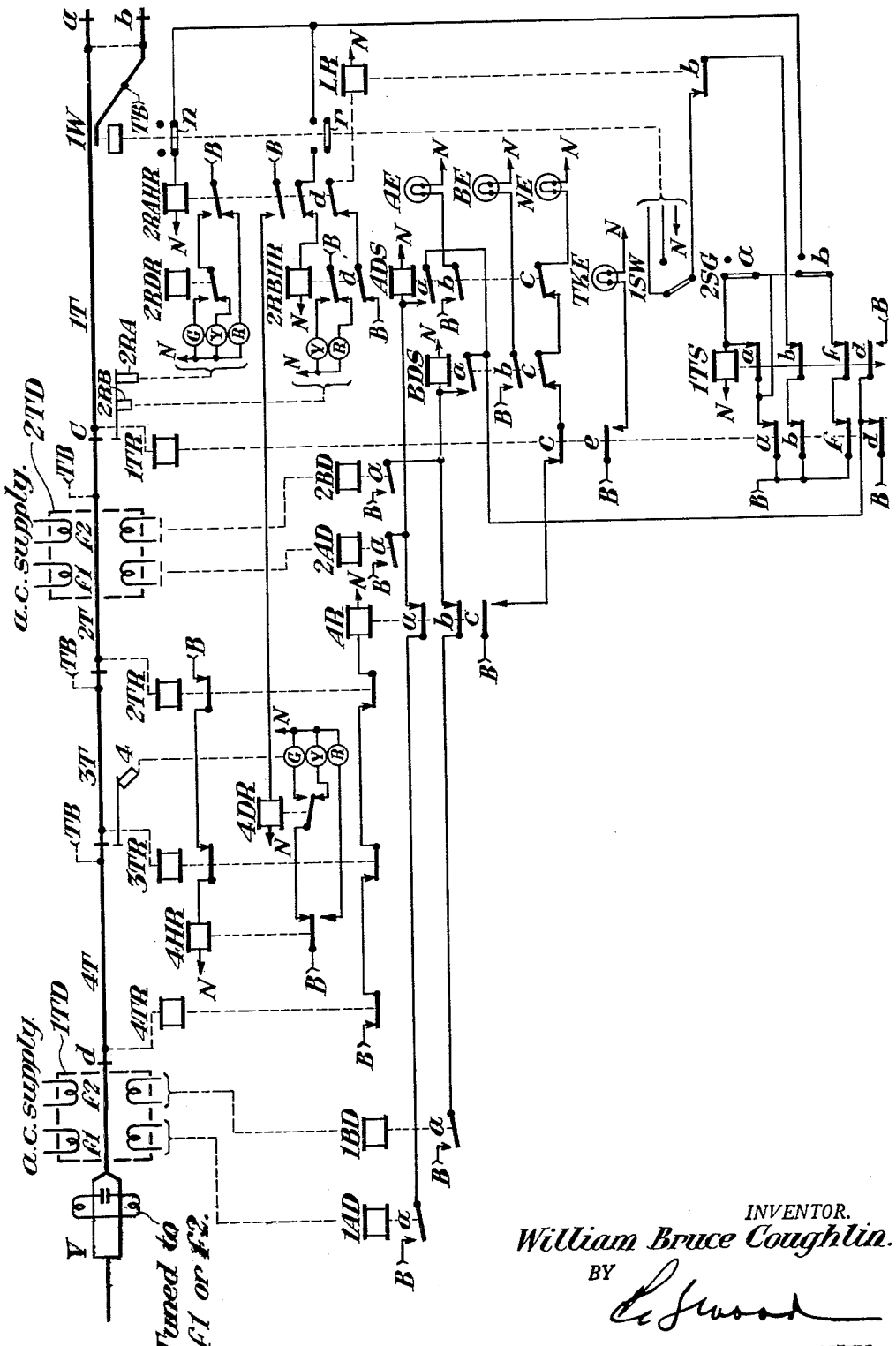
INVENTOR.
William Bruce Coughlin.
BY
HIS ATTORNEY

United States Patent Office 2,715,178
Patented Aug. 9, 1955

2,715,178

TRAIN DESCRIBER SYSTEM

William Bruce Coughlin, New York, N. Y., assignor to Westinghouse Air Brake Company, a corporation of Pennsylvania Application June 16, 1951, Serial No. 231,951

7 Claims. (Cl. 246—124)

My invention relates to a train describer system, and more particularly to improved apparatus for automatically indicating the route or destination of an approaching train at an interlocking plant, for the purpose of facilitating the work of the operator at setting up routes for successive trains in the order of their approach.

In systems of this character, it is the conventional practice to manually transmit the indications of the train class or destination from the point of origin of the train or from an intermediate station on its route, as illustrated for example in Letters Patent of the United States No. 1,830,820 of Henry S. Young and No. 2,206,550 of Ralph Mordin. In the system of the present application, the indications are transmitted automatically by means of a suitable train identification system in which one or more wayside relays at a control point are momentarily operated by means carried by the passing train in such a manner as to identify the route which the train is to take. At the interlocking plant, the route for the first of the approaching trains is indicated by the lighting of one of a group of lamps selected by storage relays governed by those at the control point. Each route indication is cancelled as soon as the corresponding train occupies its route, to render the route indicator available for indicating the route of the next following train.

In manually controlled train describer systems the control point may be a considerable distance from the plant. In any case, to avoid delaying the movement of a high speed train, this distance should be not less than the length of the usual approach zone so as to insure that the operator will be able to set up a route and to clear the entering signal in time to enable the engineman to observe the corresponding distant signal at clear.

Heretofore, as illustrated by the patents referred to as well as by numerous others, it has been the practice to provide a series of cascade connected storage indicators sufficient in number to store indications for all of the trains which may at any one time occupy the space between the control point and the plant, with means for cancelling the indication of the first train as soon as it enters the plant and for then displaying the indication for the next following train in the same indicator. Train describer systems of this type tend to become exceedingly complicated, and present certain opportunities for the display of incorrect indications, due to switching movements or to the passage of unidentified trains or the like.

The primary object of the present invention is to overcome the disadvantages of multiple storage indicators in a system of the type mentioned, by the provision of simpler and more positive means for displaying indications of the routes of successive trains in their order of approach employing only a single indicator.

In accordance with my invention, I provide a storage indicator at the receiving point comprising a group of relays for indicating the route to be established for the first of a series of approaching trains. This indicator is released to cancel the stored indication as soon as the corresponding train enters the route, and thereupon becomes available to store and indicate the route for the next following train. A feature of my invention is the provision of two transmitters located at different spaced points for the control of this route indicator. The more remote of the two transmitters is preferably located not more than a train length in the rear of the entrance to the approach zone which a train must traverse before entering the plant, and is arranged to be actuated by a passing train to selectively actuate the indicator in accordance with the route through the plant to be taken by the train, only if this approach zone is unoccupied at the time the train passes this transmitter. The second transmitter, which is similar to the first, is located within the approach zone at a point not more than a train length in the rear of the entering signal, and serves to operate the indicator under conditions when it is not operable by the first transmitter, as for example, for the second of two closely spaced trains.

A further feature is the provision of means for distinctively indicating the approach of a train not equipped with control means for identifying its route.

I shall now describe one form of apparatus embodying my invention, and shall then point out the novel features thereof in claims.

In the accompanying drawing, a diagram is shown of a stretch of railway track equipped with the circuits and apparatus embodying my invention. The track rails are represented diagrammatically by a single line, and are divided by insulated joints to form a series of track sections 1T to 4T, inclusive, each equipped with a normally closed track circuit having a track battery TB connected across the rails at one end and a normally energized track relay, 1TR to 4TR, at the other end. Section 1T is within the limits of the interlocking plant and includes a track switch 1W which is manually controllable under proper traffic conditions by the operation of a switch lever 1SW in a control tower or wayside station, to establish either a main line route c—a or a diverging route c—b, over which traffic movements in the left to right direction are governed by entering signals 2RA and 2RB. The portion d—c of the stretch constitutes the approach zone for these signals, and comprises the three sections 4T, 3T and 2T, the track relays for which release a normally energized approach relay AR when any part of the approach zone d—c is occupied by a train.

To simplify the drawing, only the minimum amount of apparatus deemed necessary to illustrate the principles of my invention is shown, and only the terminals of the local sources of current are shown, these being identified by the reference characters B and N, respectively.

The signals are of the color light type, having lamp circuits controlled by relays. The signal relays 2RAHR and 2RBHR, for the entering signals, are manually controllable in accordance with the route established by switch 1W, by the operation of a signal lever 2SG. These signal relays are also controlled by a stick repeater relay 1TS of the track relay 1TR, in such a manner as to prevent the automatic clearing of a signal for a second train, in the event the operator neglects to return the lever 2SG to its normal position before the first train vacates section 1T.

In order to operate switch 1W, a locking relay LR must be energized over the back contacts d of the signal relays 2RAHR and 2RBHR to indicate that the signals are properly at stop. The circuits for relay LR are here shown only in symbolic form, and in practice this relay is also controlled by approach and time locking means to prevent the operation of the switch for a predetermined time locking period following the manual return of a signal to stop in front of an approaching train. Switch 1W is operable to its normal or reverse position, in accordance with the position of the switch lever 1SW, over a circuit which is closed from terminal B over contacts b of relays 1TR, 1TS and LR through the switch machine to terminal N, only when all of these relays are energized. When the signal lever is reversed, relay 2RAHR or 2RBHR is energized over the circuit from terminal B over contacts f of relays 1TR and 1TS, the reverse contact b of the signal lever 2SG, a switch indication contact n or r, closed by switch 1W when locked mechanically in its normal or reverse position, respectively, and thence through the relay winding to terminal N. The reversal of lever 2SG opens its contact a in the pickup circuit for relay 1TS, and this relay is then held energized over the stick circuit which includes contacts a of relays 1TR and 1TS, and releases when section 1T is occupied by a train.

Each signal normally indicates stop by the lighting of a red lamp R, and is adapted to indicate caution by the lighting of a yellow lamp Y when the associated signal control relay is energized. Signal 2RA is also adapted to indicate proceed by the lighting of a green lamp G, when a line relay 2RDR is energized, this relay being controllable by traffic conditions in the main track to the right of point a by means not shown. The distant signal 4 in the rear is similar to signal 2RA but is controlled automatically by a home relay 4HR to indicate caution when the block comprising sections 2T and 3T is unoccupied, if signal 2RA indicates stop, and a distant relay 4DR is controlled so as to cause signal 4 to indicate proceed when relays 4HR and 2RAHR are both energized.

The train identification system preferably is of the type shown in a pending application for Letters Patent of the United States, Serial No. 213,776, filed by Richard W. Treharne, Jr. on March 3, 1951, for Vehicle Reporting Systems. However, any other suitable system may be used, and for an understanding of the present invention it may be assumed that the transmitter portion of the system, which is illustrated by the devices 1TD and 2TD, comprises a plurality of primary windings, one for each route to be indicated, each having a secondary winding which normally is not effectively coupled thereto, to which a relay such as relay 1AD is connected. Each primary winding is normally supplied with alternating current of a frequency different from that supplied to the others and which is distinctive for its route, and supplies current to its secondary to energize the relay only when a coupling coil tuned to resonance at that particular frequency is interposed, or at least brought into proximity with the corresponding pair of windings. Each train to be identified, as typified by the vehicle V, is equipped with such a coil, tuned to resonance at the particular frequency corresponding to its route. As shown, there are two routes to be provided for and it is to be understood that a first frequency $f1$ identifies the main line route $c-a$ and a second frequency $f2$ identifies the diverging route $c-b$. It follows that relay 1AD will be momentarily energized when a train passes the transmitter 1TD, if its coupling coil is tuned to frequency $f1$, and that relay 1BD will be momentarily energized in place of relay 1AD, if the coupling coil is tuned to frequency $f2$. Furthermore, relay 2AD or 2BD will be similarly operated when the train passes the transmitter 2TD. The received indications are transmitted over line wires to the control tower where they are stored in an indicator comprising the stick relays ADS and BDS by which route lamps AE and BE are selectively lighted on the operator's control panel, to designate the route of the approaching train.

The panel also includes a lamp NE, the lighting of which indicates the approach of an unidentified train, and a lamp 1TKE for indicating the occupancy of the switch section 1T.

Each route indication is cancelled when the corresponding train enters section 1T, due to the opening of the stick circuit for the energized storage relay ADS or BDS. This circuit may be traced from terminal N through the relay winding and front contact a to terminal B at front contact d of relay 1TR. Relay 1TS is a slow release relay and its release follows that of relay ADS or BDS. The closing of back contact d of relay 1TS then reconnects terminal B to the stick circuit for the storage relays, enabling an indication of the route for a second train to be stored and displayed while section 1T is occupied by a first train.

The identification system may be expanded in an obvious manner to enable it to indicate additional routes. If, for example, route $c-a$ is branched at a second similarly equipped interlocking plant at the right, to form two routes, the devices 1TD and 2TD associated with the first plant would have their relays 1AD and 2AD each controllable by two frequencies so that the same storage relay ADS would be operated, while at the second plant these frequencies would control different storage relays. Alternatively, the first plant may contain the full quota of storage relays and these may control an indicator located on a station platform to display indications of the final destination of each train.

The operation of the apparatus of my invention under different assumed conditions will now be described. It will first be assumed that the apparatus is in its normal condition, as shown, and that a train V carrying a coupling coil tuned to frequency $f2$ is approaching point $d$. When the train passes the transmitter 1TD, relay 1BD is momentarily energized, completing a pickup circuit from terminal B at its front contact a over contact b of the approach relay AR through the winding of relay BDS to terminal N, and relay BDS picks up and is held energized over the stick circuit already described. By closing its contact b, relay BDS lights the lamp BE designating the route $c-b$, and by opening its contact c prevents the closing of the circuit for lamp NE when the train occupies the approach zone and releases relay AR.

The operator now reverses the switch lever 1SW to set up the indicated route $c-b$, and when this is established, reverses the signal lever 2SG, thereby energizing relay 2RBHR to clear signal 2RB for the approaching train, which releases relay LR to lock switch 1W in its last operated position.

Since this is a slow speed route, signal 4 displays a caution indication to the approaching train, and indicates stop from the time the train enters section 3T until it vacates section 2T. When the train passes transmitter 2TD, relay 2BD is operated to supply an energizing impulse to relay BDS which, in this instance, is without effect for the reason that relay BDS is already in its energized position.

If a second train equipped with a coupling coil tuned to frequency $f1$ or $f2$ passes the transmitter 1TD while relay AR is released due to the presence of the first train, no indication will be transmitted by transmitter 1TD due to the fact that the line circuits controlled by relays 1AD and 1BD will be open at contacts a and b of the approach relay AR.

When the first train enters section 1T, relay 1TR releases, releasing relay BDS to cancel the stored route indication displayed by lamp BE; releasing relay 2RBHR to cause signal 2RB to indicate stop, and also lighting lamp TKE over its contact e to indicate route occupancy. Relay 1TS then releases and reconnects terminal B to the stick circuits for relays ADS and BDS. The indicator thus becomes available for the storage of the indication of a second train before it is able to pass the device 2TD, on account of the occupancy of the adjacent track by the rear portion of the first train.

It will be evident that the second train will transmit its identification by actuating transmitter 2TD instead of transmitter 1TD. The second train will be running at a relatively slow speed, for the reason that signal 4 will be at stop when the second train enters the approach zone, and even though the operator receives its route indication, he will be unable to start setting up the route until the first train vacates section 1T. If at that time the second train has not yet passed the device 2TD, its approach will be temporarily indicated by the lighting of lamp NE.

The approach of an unequipped train is also indicated by the lighting of lamp NE, but in this case lamp NE will remain lighted until a route has been set up for it, and it has entered section 1T.

Assuming now that the second train referred to has vacated route c—b and that a train having its coupling coil tuned to frequency f1 approaches point d. This train will operate relay 1AD and thereby energize the storage relay ADS to light the route lamp AE. The operator will accordingly restore switch 1W to normal by operation of the switch lever 1SW, and will then reverse the signal lever, energizing relay 2RAHR to clear signal 2RA and to complete the circuit for relay 4DR to cause the display of a proceed indication by signal 4 in front of the approaching train. This train therefore may proceed at its authorized speed through the plant.

The system of this invention provides a maximum assurance for the display of a correct indication for each train, due to its simplicity, since the display of each indication involves the operation of only two relays, a transmitter relay controlled directly by the train involved, and a stick repeater relay for storing the transmitted indication.

Although I have herein shown and described only one form of apparatus embodying my invention, it is understood that various changes and modifications may be made therein within the scope of the appended claims without departing from the spirit and scope of my invention.

Having thus described my invention, what I claim is:

1. A train describer system for a stretch of railway track traversed by trains equipped with devices which identify the routes for such trains, an approach zone in said stretch, a wayside station at a point in said stretch at one end of said approach zone, a first transmitter at a point in said stretch at the other end of said approach zone, a second transmitter at a point within said approach zone, a storage indicator at said station adapted to store the route indications only one at a time, and to display each indication when stored, train carried means for momentarily and selectively actuating each transmitter upon the passage of a train to identify such train, means controlled by each transmitter when actuated for correspondingly actuating said indicator, said first transmitter being effective only if actuated when the approach zone is not occupied, and means for releasing said indicator to cancel the stored indication when a train enters the portion of track adjacent said station.

2. In a train describer system, a stretch of railway track, a storage indicator at a station in said stretch for governing the display of an indication of the route to be taken by the first of a series of approaching trains, a first and a second transmitter each selectively operable by identifying means on passing trains for controlling said indicator to effect the display of the route indications for such trains, said first transmitters being located in the rear of an approach zone which the trains must traverse to reach said station, said second transmitter being located within said approach zone, circuit means for preventing the operation of said indicator by said first transmitter when said approach zone is occupied by a train, and means for releasing said indicator when a train arrives at said station, said releasing means being effective to cancel the route indication for said train and to render the indicator available for the storage of the route indication for the next following train before the first train leaves said station.

3. In a train describing system for a stretch of railway track including an approach zone and having a station at a point at one end thereof, a storage indicator at said station for displaying indications of the routes to be taken by trains approaching said station, said indicator comprising: means for storing the route indication for only one train at a time, a first transmitter at a point in said stretch beyond the other end of said approach zone, a second transmitter at a point within said approach zone, a train carried device adapted to supply an indication to each transmitter upon the passage of the train carrying such device, to distinctively indicate its route, circuits controlled by each transmitter for transmitting the indication supplied thereto to said storage indicator, said first transmitter being effective only if actuated when the approach zone is unoccupied, and means for releasing said storage indicator to cancel the stored route indication for each train upon its arrival at said station.

4. In a train describer system, a stretch of railway track, a storage indicator at a station in said stretch for governing the display of an indication of the route to be taken by the first of a series of approaching trains, a first and a second transmitter each selectively operable by identifying means on passing trains for controlling said indicator, to effect the display of the route indications for such trains, said first transmitter being located in the rear of an approach zone which the trains must traverse to reach said station, said second transmitter being located within said approach zone, a normally energized approach relay which reflects the unoccupied condition of said approach zone, a normally energized track relay which reflects the unoccupied condition of that portion of said stretch of track which adjoins said station, circuit means for preventing the operation of said indicator by said first transmitter except when said approach relay is energized, and means for releasing said indicator to cancel the stored indication in response to the release of said track relay.

5. In a train describer system arranged as described in claim 4, means for indicating the approach of an unidentified train comprising an additional indicator having an energizing circuit which includes a back contact of said approach relay, and means for preventing the closing of said circuit when a route indication is displayed by the storage indicator or when said track relay is released.

6. In combination with a stretch of railway track including a track section and an adjoining approach zone, a normally energized track relay responsive to traffic conditions in said track section, a normally energized approach relay responsive to traffic conditions in said approach zone, a track switch in said track section operable to normal or reverse to establish different routes for trains approaching from the direction of said approach zone, a storage indicator including at least two stick relays for indicating such routes, a first and second transmitter relay for each stick relay, one at a point passed by an approaching train before entering said approach zone, the other at a point within said approach zone, two pickup circuits for each stick relay including normally open contacts of the associated first and second transmitter relay respectively, each circuit controlled by a first transmitter relay also including a front contact of said aprpoach relay, a stick circuit for each stick relay including a front contact of said track relay, and train carried means for selectively and successively actuating the two transmitter relays which control the same stick relay when an approaching train passes their respective locations, to thereby indicate the route for such train by the operation of the corresponding stick relay.

7. In combination with a stretch of railway track comprising a switch section including a track switch and an adjoining approach zone, a track relay which is energized only when said switch section is unoccupied, a slow acting repeater relay for said track relay, an approach relay which is energized only when said approach zone is unoccupied, said track switch being operable to normal or reverse to establish different routes for trains approaching from the direction of said approach zone, a storage indicator including two stick relays, one for each route, a first and a second transmitter relay for each stick relay, one at a point passed by a train approaching in said direction before entering said approach zone, the other at a point passed by a train when in said approach zone, two pickup circuits for each stick relay including normally open contacts of the associated first and second transmitter relay respectively, each circuit controlled by a first transmitter relay also including a front contact of said approach relay, two stick circuits for each stick relay, one including a front contact of said track relay, the other including a back contact of its repeater relay, and train carried means for selectively and successively actuating the two transmitter relays for the same stick relay when an approaching train passes their respective locations, whereby a selected one of said stick relays is actuated to indicate the route for such train, either by its first or second transmitter relay, depending upon the location of a preceding train.

References Cited in the file of this patent
UNITED STATES PATENTS

| | | |
|---|---|---|
| 2,098,829 | McCann | Nov. 9, 1937 |
| 2,122,358 | Preston | June 28, 1938 |
| 2,184,702 | Phinney | Dec. 26, 1939 |
| 2,414,472 | Loughridge | Jan. 21, 1947 |
| 2,535,162 | Rodgers | Dec. 26, 1950 |